United States Patent [19]

Peloza

[11] 4,270,728
[45] Jun. 2, 1981

[54] BLOCK MOUNTED AUTOMOTIVE HEATER CONTROL VALVE

[75] Inventor: Kirk Peloza, Glen Ellyn, Ill.

[73] Assignee: Eaton Corporation, Cleveland, Ohio

[21] Appl. No.: 76,892

[22] Filed: Sep. 19, 1979

[51] Int. Cl.³ .............................................. F16K 51/00
[52] U.S. Cl. .................................... 251/143; 137/338; 285/381
[58] Field of Search ................ 137/338; 251/143, 368; 285/239, 381, 423, DIG. 10

[56] References Cited

U.S. PATENT DOCUMENTS

| | | | |
|---|---|---|---|
| 2,779,061 | 1/1957 | Hosking | 285/239 X |
| 3,513,429 | 5/1970 | Helsop | 285/381 |
| 3,677,283 | 7/1972 | Tito | 137/338 |
| 3,971,540 | 7/1976 | Johnson et al. | 251/143 |

Primary Examiner—William R. Cline
Attorney, Agent, or Firm—R. J. McCloskey; E. C. Crist; R. A. Johnston

[57] ABSTRACT

Fluid valves for use in internal combustion engines incorporate both plastic and metal housings which are joined at the inlet end to a metallic adapter by means of staking portions of the adapter over the exterior of the valve inlet housing tube. Valves having this type of connection are prone to failure caused by abuse encountered during valve installation and engine maintenance. In the present invention a fluid valve (10) is provided having superior strength at the junction between a plastic inlet (34) and a threaded metallic engine block adapter (14). A portion of the adapter extends into the inlet end of the housing and has a circumferential rib (48) having an outer knurled surface (50) located intermediate and adjacent to a pair of grooves (52, 54). By heating the knurled rib (48), the plastic material of the hollow inlet portion of the valve housing flows into and conforms with the grooves and the knurled rib thereby providing a rigid connection between the valve housing and the adapter. A seal ring (58) is mounted in a groove formed in the adapter and functions to fluidly seal the adapter to the inlet end of the housing.

5 Claims, 3 Drawing Figures

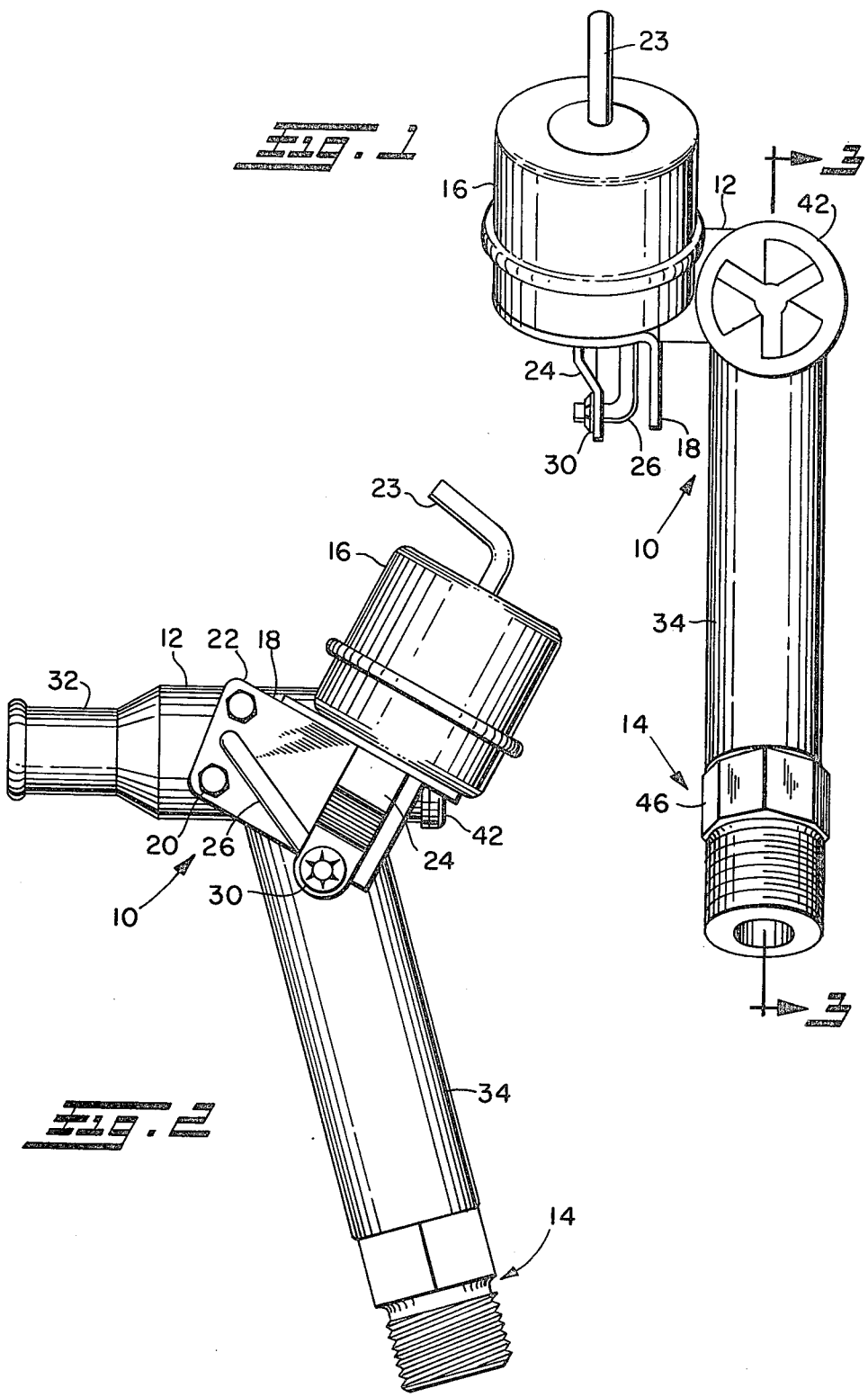

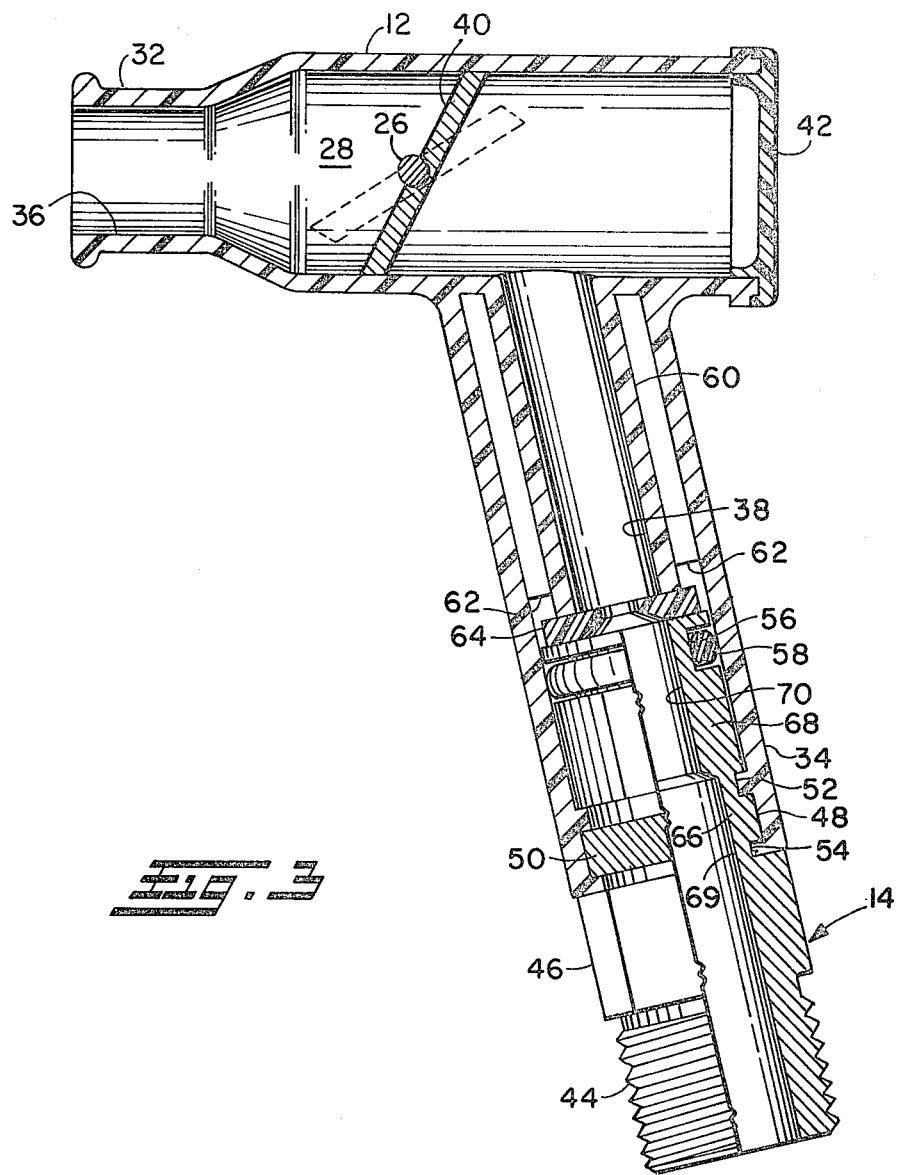

BLOCK MOUNTED AUTOMOTIVE HEATER CONTROL VALVE

BACKGROUND OF THE INVENTION

1. Field of the Invention

The present invention relates to control members which require direct mounting to a rigid base member of the controlled device and more particularly to fluid valves which are directly mountable to the engine block of an internal combustion engine 2. Prior Art Water valves mountable directly to the engine block of internal combustion engines are known in the art and include those valves having a sheet metal housing with a machined adapter brazed to a tubular portion of the valve housing. The adapter typically has a male pipe thread and wrench flats on the end that mounts to the engine block. The wall thickness of the adapter is made rigid enough to withstand wrench torque loads experienced during valve installation.

Other known valves incorporate a valve housing formed of plastic in order to further reduce unit cost. An inlet conduit portion of the plastic valve housing is connected to a metallic adapter similar to that described above. A thin walled metal portion on the adapter is then crimped or staked over the lower end of the valve inlet conduit. Problems have arisen with this type of connection due to the inherently low strength of the joint. Side loading or inadvertent impact loading to the valve housing can deliver a moment load of sufficient intensity to cause a failure at the junction of the adapter and valve housing inlet.

SUMMARY OF THE INVENTION

In the present invention a fluid valve is provided having a plastic inlet conduit portion which is connected to a steel adapter by heat forming. The steel adapter enables the valve to be directly connected to the engine block of an internal combustion engine.

The lower end of the adapter which connects to the engine block has a pipe thread and wrench flats formed thereon and also has a wall thickness sufficient to withstand torque loads from wrench tightening during assembly of the valve to the engine block. The upper end of the adapter extends into the lower end of the valve inlet conduit. The inlet end of the plastic valve housing is connected to the adapter by an induction heating process which heats the metal of the adapter, thereby transferring heat to the plastic material which then flows into and closely conforms with two circumferential grooves and a circumferential rib intermediate the grooves. The peripheral surface of the rib is knurled, thus allowing the plastic to fill the discontinuities of the knurled surface for resisting torque loads applied to the connection. The plastic material which conforms to the rib and the grooves resists pull off of the plastic inlet from the adapter.

A seal ring is mounted in an external groove formed in the wall portion of the adapter that extends into the valve inlet conduit. The seal functions to fluidly seal the interface between the adapter and the internal diameter of the plastic inlet conduit.

The wall thickness of the adapter immediately beneath the flash traps and knurled rib is substantially less than the thickness of the adapter in the area adjacent the seal ring. This difference in mass between the two sections of the adapter creates a heat receiving zone in the area adjacent the grooves and knurled rib and a heat sink zone in the area adjacent the seal ring. This feature permits a rapid temperature rise of the adapter in the heat receiving zone, thereby allowing rapid softening of the plastic inlet end and conformation of the plastic material to the contour of the grooves and rib. The increased mass in the heat sink zone allows heat to be removed therefrom, thus preventing damage to the seal ring.

The ends of the adapter and the inlet conduit overlap an amount sufficient to eliminate concentrated moment loading in the area around the rib and grooves.

It is therefore an object of the invention to provide a low cost fluid valve having a plastic housing and a rigid metallic adapter connected thereto by a connection which is resistent to pull-off, bending and torque exerted during connection of the valve to an engine block.

It is another object of the invention to provide a metallic adapter connected to plastic portions of a fluid valve by heat forming wherein the adapter has a heat sink portion for absorbing heat transmitted to portions of the adapter for preventing damage to a seal ring mounted in the adapter.

BRIEF DESCRIPTION OF THE DRAWINGS

FIG. 1 is an end view in elevation of an embodiment of the invention;

FIG. 2 is a view in elevation as viewed from the left side of FIG. 1; and,

FIG. 3 is an enlarged sectional view taken along lines 3—3 of FIG. 1 illustrating the connection between the plastic valve housing and the adapter.

DETAILED DESCRIPTION

Referring now to FIGS. 1 and 2 a fluid valve, indicated generally at 10, embodying the principles of the invention is shown as including a plastic valve housing 12 and an adapter indicated generally at 14 connected to the lower end of housing 12 and extending therefrom. A vacuum motor, indicated at 16, is mounted to the side of valve housing 12 by a bracket 18 which is secured thereto by screws 20 and 22. A nipple 23 extends from one end of vacuum motor 16 and is connectable to an engine vacuum source (not shown). An output member 24 extends from vacuum motor 16 and is connected at the lower end thereof to a crank 26 which has a portion thereof shown partially by FIG. 3 extending into a fluid chamber 28 defined by housing 12. A retaining washer 30 is received over the free end of crank 26 and functions to align and maintain in engagement output member 24 on crank 26.

As shown by FIGS. 2 and 3, valve housing 12 includes a fluid outlet portion 32 and a fluid inlet portion 34 which define, respectively, an outlet passage 36 and an inlet passage 38. Fluid inlet portion 34 is molded from a thermoplastic material which is compatible with known heat forming techniques, as will be described subsequently in greater detail. An end cap 42 is sealingly connected to the right end of housing 12.

A butterfly valve member 40 is connected to crank 26 and is rotatable between a closed position as shown by the solid line of FIG. 3 in which the outer periphery of valve member 40 seats against the internal walls of fluid chamber 28 and an open position as represented by the dashed lines of FIG. 3.

As shown by FIG. 3, adapter 14 is a tubular member formed of a metallic material capable of being heated by induction heating and has machined on its lower end a tapered pipe thread 44 and above thread 44 hexagonal wrench flats 46 for facilitating installation to an engine block of an internal combustion engine (not shown). The section of adapter 14 above wrench flats 46 includes a circumferentially extending rib 48 having a knurled outer surface 50. Circumferentially extending grooves 52 and 54 are located on each side of rib 48.

An annular groove 56 is formed into the outer surface of adapter 14 and is located closely adjacent the upper end thereof. A seal ring 58 is received in groove 56 and functions to fluidly seal the interface between the periphery of adapter 14 and the internal wall of inlet fluid conduit 34. The amount that adapter 14 extends into inlet portion 34 aids in resisting bending moments from side loads exerted on the valve housing.

An internal tubular section 60 is integrally molded within inlet fluid conduit 34 and rigidly supported relative thereto by a plurality of radially extending ribs 62. A resilient flow control washer 64 of a type well known in the art is disposed between the upper end of adapter 14 and the lower end of internal tubular section 60 for limiting the fluid flow rate into inlet 38.

Inlet portion 34 is connected to adapter 14 by heating rib 48 to a temperature sufficient to allow portions of the plastic material of inlet portion 34 to soften and flow into grooves 52 and 54 and also to conform to the knurled pattern 50. Various methods of heating rib 48 may be utilized, however, induction heating has been found particularly suitable.

The wall thickness of adapter 14 immediately below rib 48 and grooves 52 and 54 is sized substantially thinner than the wall thickness of the portion of the adapter towards groove 56. A section of adapter 14 located above the upper end of wrench flats 46 to and including groove 52 is designated as a heat receiving zone 66 while that section past groove 52 is designated as a heat receiving zone 68. The increased mass of heat sink zone 68 aids in preventing excessive temperature rise in that zone which might adversely affect the physical properties of seal ring 58. An auxiliary heat sink, not shown, may be inserted in heat transfer relationship under heat sink zone 68 to remove excessive heat which might be conveyed thereto. Heat receiving zone 66 has an internal diameter 69 and heat sink zone 68 has an internal diameter 70 sized less than diameter 69 to facilitate insertion of an auxiliary heat sink and also for increasing the mass of heat sink zone 68.

The basic operation of valve 10 will be apparent to those having ordinary skill in the art upon viewing FIGS. 1 through 3 and, in brief, fluid flowing through adapter 14 and inlet passage 38 flows into fluid chamber 28 whereupon valve member 40 either shuts off or permits fluid flow to outlet passage 36, based upon whether or not vacuum motor 16 is actuated.

Further modifications and variations will be apparent to those having ordinary skill in the art and the invention is limited only by the following claims.

What is claimed is:

1. A fluid valve mountable to an engine block of an internal combustion engine, said valve comprising:
   (a) housing means, said housing means defining a fluid passageway having an inlet portion and an outlet portion;
   (b) valve means operably connected to said housing means for valving fluid flow through said fluid conduit;
   (c) said inlet portion having a hollow end section formed of a heat deformable material;
   (d) means for mounting said fluid valve to said engine block, said mounting means including a metallic tubular member, said tubular member having a first portion adapted for connection to said engine block and a second portion received in said hollow end section of said conduit inlet portion, said second portion having a heat receiving zone and a heat sink zone adjacent said heat receiving zone, said heat receiving zone having a mass substantially less than said heat sink zone, said heat receiving zone including external surface means which have the material of said inlet portion deformed and received therein and engaging with said hollow end section for connecting said hollow end section to said mounting means; and
   (e) seal means disposed intermediate the external surface of said heat sink zone and the internal surface of said hollow end section for effecting fluid pressure sealing therefrom.

2. The device as defined in claim 1, wherein said external surface means includes,
   (a) a circumferentially extending groove;
   (b) a circumferentially extending rib disposed closely adjacent said groove, said rib having a knurled outer surface; and
   (c) wherein said heat sink zone has an external diameter less than the external diameter of said knurled outer surface.

3. The device as defined in claim 1, wherein said external surface discontinuity means includes,
   (a) a first circumferentially extending groove;
   (b) a second circumferentially extending groove;
   (c) a circumferentially extending rib intermediate said first and second grooves; and wherein
   (d) said heat sink zone has an external diameter less than the external diameter of said rib.

4. The device as defined in claim 1, wherein said heat sink zone has a first internal diameter and said heat receiving zone has a second internal diameter, said first internal diameter less than said second internal diameter.

5. The device as defined in claim 1, wherein said seal means includes,
   (a) said heat sink zone having an external annular groove formed adjacent the end thereof and longitudinally spaced from said heat receiving zone;
   (b) a seal ring received in said groove and in fluid sealing engagement with portions of said annular groove and the internal surface of said hollow end section.

* * * * *